United States Patent [19]
Jacobsson

[11] Patent Number: 4,778,015
[45] Date of Patent: Oct. 18, 1988

[54] PNEUMATIC POWER WRENCH

[75] Inventor: Rolf A. Jacobsson, Saltsjö-Boo, Sweden

[73] Assignee: Atlas Copco Aktiebolag, Nacka, Sweden

[21] Appl. No.: 944,248

[22] Filed: Dec. 18, 1986

[30] Foreign Application Priority Data

Dec. 23, 1985 [SE] Sweden ................................ 8506124

[51] Int. Cl.[4] ................................................ B23B 45/04

[52] U.S. Cl. .................................... 173/169; 173/170; 173/DIG. 2

[58] Field of Search .................... 173/12, 18, 168–170, 173/DIG. 2; 137/489, 489.3

[56] References Cited

U.S. PATENT DOCUMENTS 2,362,608 11/1944 Allen .................................. 173/169
3,101,738 8/1963 Horlacher ........................... 137/489
3,162,250 12/1964 Sindelar ............................. 173/169
3,298,284 1/1967 Alexander .......................... 173/170

*Primary Examiner*—E. R. Kazenske
*Assistant Examiner*—James L. Wolfe
*Attorney, Agent, or Firm*—Frishauf, Holtz, Goodman & Woodward

[57] ABSTRACT

A pneumatic power wrench comprising a housing (10), a rotation motor drivingly connected to an output spindle (11), a pressure air supply passage (22, 24) in the housing (10) connecting the motor to a pressure air source and a manually operable throttle valve (17) disposed in the air supply passage (22, 24) to control the pressure air supply to the motor. An adjustable pressure regulator is arranged in the air supply passage (22, 24) upstream of the throttle valve (17) to provide a desired constant air supply pressure to the motor. The pressure regulator comprises a spring biassed relief valve (32–34) which via a venting passage (42) communicates with the exhaust passage (16) of the tool upstream of a flow restricting silencer (18) mounted therein.

3 Claims, 3 Drawing Sheets

Fig. 3
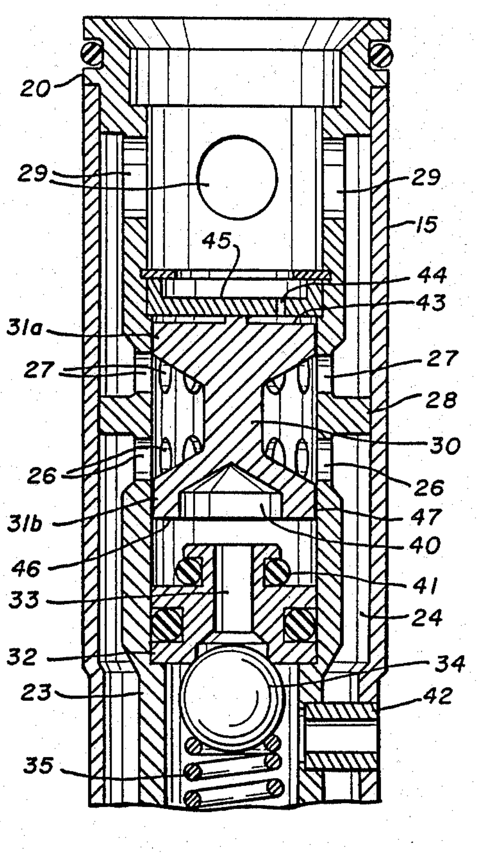
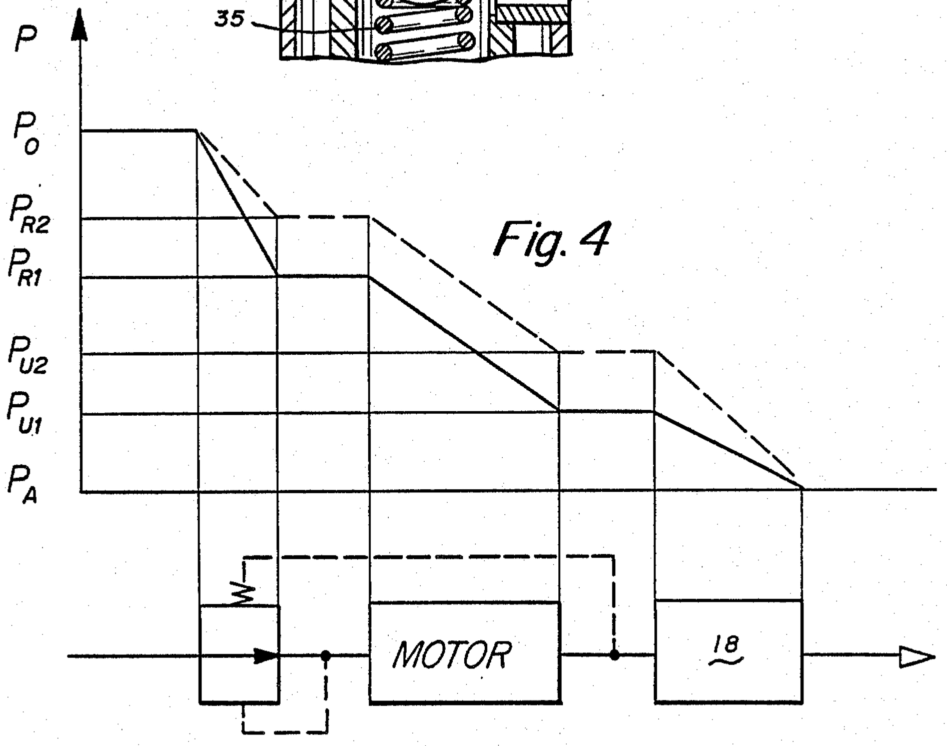
Fig. 4

PNEUMATIC POWER WRENCH

BACKGROUND OF THE INVENTION

The present invention relates to a pneumatic power wrench of the type comprising a housing, a rotation motor drivingly connected to an output spindle, a pressure air supply passage in the housing connecting said motor to a pressure air source, a throttle valve and an adjustable pressure regulator both disposed in said air supply passage to control the air flow through the latter, and an exhaust passage connecting said motor to the atmosphere and including a flow restricting silencing means located at the downstream end of said exhaust passage.

The object of the invention is to accomplish an improved pneumatic power wrench of the above type in which the pressure regulator is arranged to provide a constant air supply pressure not only in response to a the setting of a spring biased relief valve but also in response to the pressure level in the exhaust passage upstream of the silencer. This means that notwithstanding the pressure drop across the silencer the pressure drop accross the motor will always be the same.

Further objects and advantages of the invention will appear from the following description and the claims.

BRIEF DESCRIPTION OF THE DRAWINGS

FIG. 3 shows, on a still larger scale, a longitudinal section through the pressure regulator according to the invention.

FIG. 4 is a diagram illustrating the pressure drops across the pressure regulator, the motor and the silencer.

DETAILED DESCRIPTION

Figure 1:
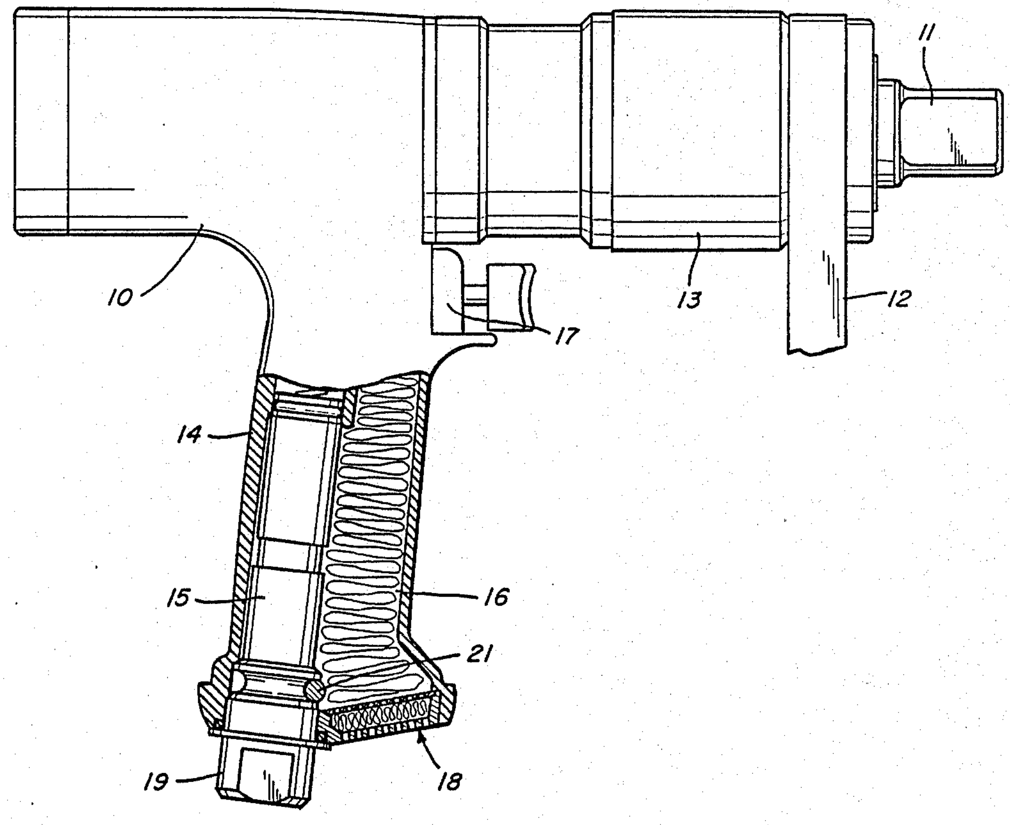
FIG. 1 shows, partly in section, a side elevation of a pneumatic power wrench according to the invention.
Figure 2:
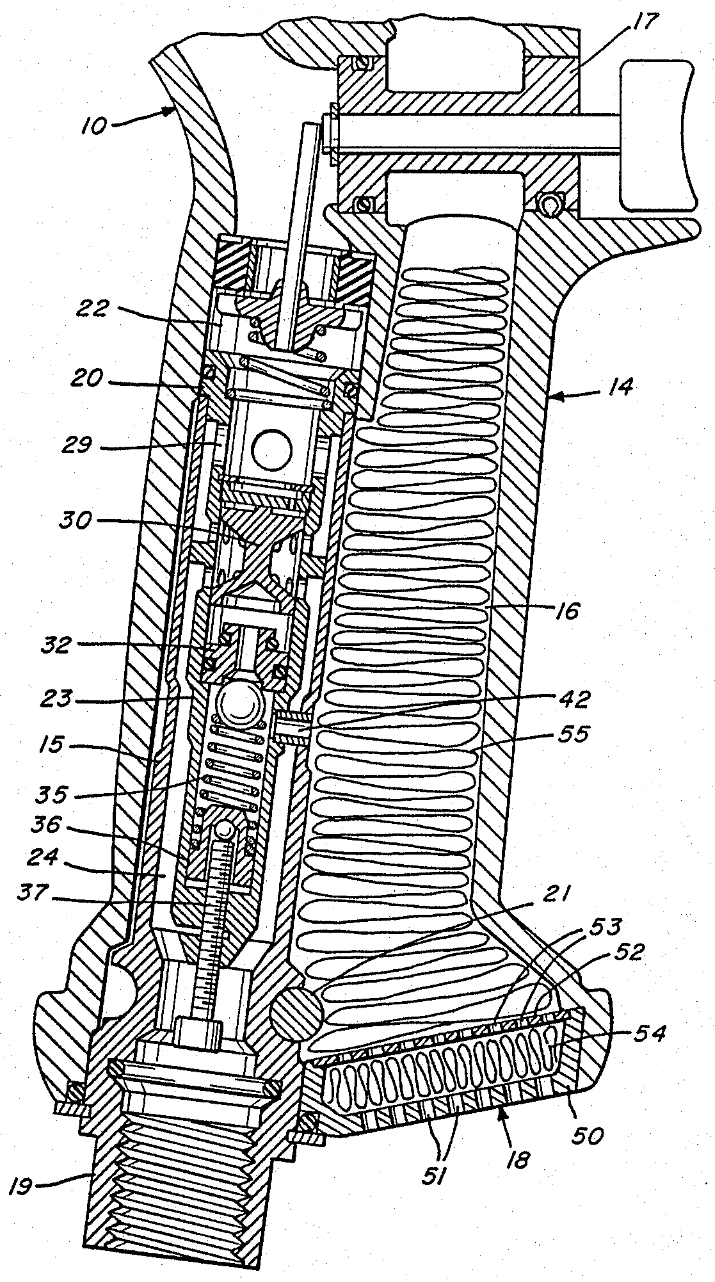
FIG. 2 shows, on a larger scale, a longitudinal section through the tool handle including the pressure regulator according to the invention.

The detailed description of a tool according to the invention starts with a reference to FIG. 1 in which the tool housing is designated 10. A rotation motor (not shown) is mounted in the housing 10 for rotating an output spindle 11 to which a screw joint engaging nut socket is attachable. The shown tool is provided with a torque reaction bar 12 which is intended to protect the operator of the tool from torque reaction forces transferred to the tool housing. The reaction bar 12 is rigidly mounted on the casing 13 of a reduction gearing which couples the motor to the output spindle 11. The tool housing 10 further comprises a handle 14 which is hollow and which receives a pressure air supply tube insert 15. The handle 14 also comprises an exhaust passage 16. At the upper end of the handle 14 there is a manually operable throttle valve 17, and at the lower end of the handle there is a silencer insert 18. The pressure air supply tube insert 15 comprises at its outer end a threaded socket 19 for connection of an air supply conduit. The tube insert 15 is received at its upper end in a socket portion 20 which forms a part of the air inlet passage 22 of the tool housing 10. The tube insert 15 is locked against axial movement by a transverse pin 21.

The air supply tube insert 15 is cylindrical in shape and encloses an inner tube 23 which on its outside defines an annular air supply passage 24. The inner tube 23 is provided with a first peripheral row of radial openings 26 and a second peripheral row of radial openings 27 axially spaced from the openings 26. Between these two rows of radial openings 26 and 27, respectively, the inner tube 23 has an outer annular flange 28 which together with the outer air supply tube insert 15 forms a barrier against the pressure air flow. This barrier forming flange 28 makes the pressure air heading for the motor to enter the inner tube 23 through the first row of openings 26 and to leave the tube through the openings 27. A third row of radial openings 29 is arranged to lead the pressure air flow back into the inner tube 23 and further on to the inlet passage 22 in the tool housing.

The pressure regulator comprises a spool shaped valve element 30 which is axially movable within the inner tube 23. The valve element 30 has an upper rim **31*a* and a lower rim 31*b* both of cylindrical shape and arranged to guidingly coöperate with the tube 23. A valve seat element 32 immovably mounted in the tube 23 comprises a central axial passage 33 which at its lower end is controlled by a ball valve 34 biased toward the seat element 32 by a spring 35. The spring 35 rests against a piston 36 which is axially adjustable by means of a set screw 37. The latter is accessible from outside the tool through the socket 19**.

At its lower end the valve element 30 is formed with a cylindrical socket portion 40 which in the lower end position of the valve element 30 is arranged to cooperate with a seal ring 41 mounted on the seat element 32. Below the seat element 32 the inner tube 23 is provided with a laterally extending connection piece 42 by which the inner of the tube 23 communicates directly with the exhaust passage 16, thereby bridging over the annular air supply passage 24 formed between the outer tube 15 and the inner tube 23.

The spool shaped valve element 30 has a first end surface 43 which communicates via a restriction opening 44 in a end washer 45 with the air supply passage downstream of the openings 27 as well as the openings 29. At its opposite end the valve element 30 has an oppositely facing end surface 46 which communicates via an annular clearance 47 between the lower rim 31b of the valve element 30 and the tube 23 with the air supply passage upstream of the openings 27. Accordingly, the valve element 30 is balanced between the pressure in the air supply passage 24 downstream of the openings 27 and the pressure in the air supply passage upstream thereof. The valve element 30 is arranged to control the pressure air flow through the openings 27 only.

The silencer insert 18 mounted at the lower end of the handle 14 comprises a cup 50 which is provided with a number of diffusor openings 51. The cup 50 is covered at its upper end by a screen 52 having a number of flow restricting openings 53 and is filled with a sound absorbing material 54.

Further sound absorption is accomplished by a light filling 55 in the exhaust passage 16 in the tool handle 14. This filling is rather porous and does not have any flow restricting influence on the exhaust flow.

The operation order of the pressure regulator according to the invention is the following:

Assuming that the pressure air supply tube insert 15 is connected to a pressure air supply conduit via socket 19 and that the throttle valve 17 is not activated pressure air enters the supply passage 24 between the outer and inner tubes 15, 23, respectively, and reaches the lower end surfaces 46 of the valve element 30 via openings 26 and the clearance 47 between the valve element 30 and the tube 23. The upper end surface 43 of the valve element is pressurized via the openings 26, 27, 29, and 44. Since the relief valve 34 is set by the adjustment screw 37 to open at a pressure well below the air source pressure air starts leaking past the relief valve 34 and out through the lateral passageway 42 into the exhaust passage 16. This results in a reduced pressure at the lower end of the valve element 30 which causes the latter to move downwardly by action of the full pressure on its upper surface 43. When reaching its lower end position the cylindrical socket portion 40 of the valve element 30 will engage the seal ring 41 on the valve seat 32 to stop the air flow through the passage 33 and past the relief valve 32. As long as the throttle valve 17 remains closed the valve element 30 of the pressure regulator will remain in its lower end position in which the periphery of the upper rim 31*a* of the valve element 30 fully covers the openings 27, thereby preventing air from flowing past the regulator.

When the throttle valve 17 is opened to start the power wrench motor the pressure on the upper end surface 43 of the valve element 30 suddenly drops to such a low level that the air pressure acting on the lower end surface 46 will dominate completely and lift the valve element 30 out of engagement with a seal ring 41. The valve element 30 is now balanced between the pressure determined by the relief valve 34 at the lower end of the valve element 30 and the pressure downstream of the regulator acting on the upper surface 43 of the valve element 30. As long as the pressure downstream of the regulator is below a certain level the valve element 30 will be moved upwards to its upper end position thereby completely uncovering the openings 27 and provide a full air flow through the regulator. This is the caes when the reaction torque on the output spindle 11 is low during the running down sequence of the threaded joint being worked. As the resistance in the joint increases the pressure on the inlet side of the motor increases as well which results in an increased force acting on the upper end surface 43 of the valve element 30. This force will be greater than the upwardly directed force acting on the lower end surface 46 of the valve element 30, because the pressure at the lower end of the valve element is reduced by means of the relief valve 34. Hence the valve element 30 will move downwardly to accomplish a flow restriction through the openings 27. This flow restriction causes the pressure downstream of the regulator to decrease to a level where the oppositely directed forces acting on the valve element 30 are balanced. By balancing the valve element 30 between a constant pressure set by the relief valve 34 on one hand and the pressure downstream of the regulator on the other hand determined by the flow restriction through the openings 27 and the back pressure from the motor there is obtained a certain maximum air pressure in the air inlet passage 22 as well as a predetermined maximum output torque delivered by the tool.

In the diagram in FIG. 4 there is illustrated how the air pressure decreases during the air passage through the tool. Starting from the left in the diagram the pressure delivered from the air source is designated $P_O$ which is not constant but may vary from time to time. Presuming that all details of the tool, including the silencer, works properly the pressure will follow the continuous line of the diagram. This means that the pressure is reduced from $P_O$ to $P_{R1}$ when passing through the pressure regulator. The pressure drop across the motor is $P_{R1}$ to $P_{U1}$ and across the silcencer $P_{U1}$ to $P_A$ wherein $P_A$ is the atmospheric pressure. The curve represents a mean value of the pressure drops based on a certain rotation speed and torque load on the air motor. At higher motor speed, under idle conditions for example the pressure drop across the motor will be less and the pressure drop across the silencer will be larger.

By venting the relief valve 34 to the exhaust passage 16 of the tool at a point upstream of the silencer 18 it is possible to obtain a constant pressure drop across the motor and, accordingly, an unaffected operation of the motor in case the silencer is choked up or damaged. The choked up silencer situation is illustrated in the diagram by the dash-line curve which clearly indicates that the pressure regulator provides an increased pressure in order to compensate for an increased pressure drop across the silencer. This means that the regulated supply pressure $P_{R2}$ is automatically compensated in response to the back pressure from the silencer such that the $P_{R2}-P_{U2}$ is equal to $P_{R1}-P_{U2}$.

I claim:

1. A pneumatic power wrench, comprising:
   - a rotation motor drivingly connected to an output spindle;
   - a pressure air supply passage in said housing connecting said rotation motor to a pressure air source;
   - a throttle valve and an adjustable pressure regulator both disposed in said air supply passage to control the air flow through said air supply passage; and
   - an exhaust passage connecting said rotation motor to the atmosphere and including a flow restricting silencing means located at a downstream end of said exhaust passage;
   - said pressure regulator comprising:
     - a pressure responsive relief valve having an upstream end which communicates with said pressure air supply passage upstream of said regulator, and having a downstream end which communicates with said exhaust passage at a location upstream of said silencing means; and
     - a movable valve element having one side which communicates with said pressure air supply passage downstream of said regulator, and having an opposite side which communicates with said pressure air supply passage upstream of said regulator and which also communicates with said upstream end of said relief valve.

2. The power wrench of claim 1, wherein said pressure regulator is located upstream of said throttle valve, and said pressure regulator further comprises a valve means associated with said valve element, said valve means being arranged to prevent pressure air from flowing from said supply passage, through said relief valve and into said exhaust passage as said throttle valve is closed.

3. The power wrench of claim 2, wherein:
   - said pressure regulator further comprises a tube element provided with a number of radial openings which are disposed in two axially spaced circumferential rows, said tube element defining on its outside said air supply passage and comprising an annular barrier forming means located on its outside between said rows of openings to make the pressure air supplied to the rotation motor enter the tube member through one of said rows of openings and leave said tube member through the other of said rows of openings; and
   - said valve element being spool shaped and axially movable in said tube element to control the air flow through the openings of one of said rows of openings.

* * * * *